United States Patent
Vecht et al.

(10) Patent No.: US 7,223,353 B2
(45) Date of Patent: May 29, 2007

(54) PHOSPHOR LAYERS FOR ELECTROLUMINESCENT PANELS AND METHODS OF THEIR MANUFACTURE

(75) Inventors: Aron Vecht, London (GB); Jack Silver, London (GB); Dominic Davies, West Wickham (GB); Philip Titler, London (GB)

(73) Assignee: Burnel University, Middlesex (GB)

( * ) Notice: Subject to any disclaimer, the term of this patent is extended or adjusted under 35 U.S.C. 154(b) by 398 days.

(21) Appl. No.: 10/476,645

(22) PCT Filed: Apr. 29, 2002

(86) PCT No.: PCT/GB02/01949

§ 371 (c)(1),
(2), (4) Date: Oct. 19, 2004

(87) PCT Pub. No.: WO02/090464

PCT Pub. Date: Nov. 14, 2002

(65) Prior Publication Data

US 2005/0052131 A1     Mar. 10, 2005

(30) Foreign Application Priority Data

May 4, 2001     (GB) .................... 0110977.6

(51) Int. Cl.
*C09K 11/02*     (2006.01)
*H05B 33/20*     (2006.01)

(52) U.S. Cl. ............... 252/301.36; 427/64; 427/65; 427/66; 427/67; 427/68; 427/71; 427/157

(58) Field of Classification Search ........... 252/301.36; 427/64, 65, 66, 67, 68, 71, 157
See application file for complete search history.

(56) References Cited

U.S. PATENT DOCUMENTS 2,834,903 A * 5/1958 Roberts ................ 313/502
5,374,377 A    12/1994 Nguyen et al.
5,589,048 A * 12/1996 De Jaeger et al. .......... 204/489
5,635,006 A *  6/1997 Watanabe et al. .......... 156/240
6,479,941 B1  11/2002 Abe et al.

FOREIGN PATENT DOCUMENTS

GB    2 017 140 A    10/1979
WO    WO 00/27169     5/2000

OTHER PUBLICATIONS

Derwent abstract for JP 73019105 B, 1973.*
Page 338, Phosphor Handbook, Yen et al:ed., 1999.*

* cited by examiner

Primary Examiner—C. Melissa Koslow
(74) Attorney, Agent, or Firm—Nixon & Vanderhye

(57) ABSTRACT

A phosphor layer for an electroluminescent panel comprises a phosphor powder held in a binder. The binder comprises a mixture of two constituents, one of which is a drying oil or a semi-drying oil or a derivative and the other constituent is a sol-gel precursers. Examples of suitable oils are linseed oil, rape seed oil, sunflower oil and soyabean oil. Examples of suitable sol-gel precursers are tetraethyl orthosilicate, boron iso-propoxide, aluminium sec-butoxide and titanium iso-propoxide. Metal salts such as metal alkoxides, metal acetates and metal nitrates may be mixed with the sol-gel precursers.

9 Claims, No Drawings

PHOSPHOR LAYERS FOR ELECTROLUMINESCENT PANELS AND METHODS OF THEIR MANUFACTURE

This application is the U.S. National Phase of International Application PCT/GB02/01949, filed 29 Apr. 2002, which designated the U.S.

This invention relates to phosphor layers for electroluminescent panels and methods of their manufacture. It has particular application to ac electroluminescent panels.

An electroluminescent panel typically comprises a phosphor layer sandwiched between layers of conductive material which act as the electrodes and between which a voltage is applied. In the case of ac electroluminescent panels the voltage that is applied is an ac voltage. At least one of the electrodes is usually transparent. Since the phosphor material in the layer is usually in powder form it is necessary in manufacture to mix the powder with a suitable binder material. The binder material should be insulating, have a high dielectric constant and not be light restrictive. It should also have a high breakdown voltage. Typical binder materials that are used are plastics materials such as polystyrene, methyl methacrylate and polyvinyl chloride. Other binder materials are celluloses, such as cyanoethyl cellulose and nitro cellulose, dissolved in organic solvents. Polymerised perfluorinated hydrocarbons can also be used. It is also known to use ceramic dielectrics, but these materials are characterised by low luminance compared to plastics and polymeric binders and do not provide the flexibility of polymeric materials. However even the polymeric materials have limited flexibility and all the above-mentioned binder materials are expensive. Additionally since the dielectric strength of the phosphor layer may not be sufficient additional dielectric layers, comprising for example barium titanate, may need to be included between the electrodes.

It is an object of the invention to provide a phosphor layer for an electroluminescent panel which is flexible, has good electrical properties and makes use of binder materials which are not expensive.

According to the invention in one aspect a phosphor layer for an electroluminescent panel comprises a phosphor powder held in a binder comprising a mixture of two constituents, one constituent being one or more drying oils or semi drying oils or derivatives thereof and the other constituent being one or more sol-gel precursors.

According to the invention in another aspect a method of manufacturing a phosphor layer for an electroluminescent panel comprises mixing two constituents to form a binder, one constituent being one or more drying oils or semi drying oils or derivatives thereof and the other constituent being one or more sol-gel precursors, mixing a phosphor powder with the binder and then allowing the resulting mixture to dry.

The invention also comprises an electroluminescent panel comprising a pair of electrodes between which is sandwiched a phosphor layer manufactured as described above.

A drying oil is an oil that has a drying index of 70 or more. Examples of stable drying oils are linseed oil, rape seed oil and sunflower oil. A semi drying oil has a drying index below 70, but such an oil can still be used to carry out the invention. An example of a semi drying oil is soyabean oil. Examples of derivatives of these oils are the alkyds thereof, which may be prepared by the monoglyceride process or the fatty acid process. Other derivatives, for example unsaturated organic compounds such as linolinic acid and other fatty acids may also be used.

Examples of particular compounds that are sol-gel precursors are tetraethyl orthosilicate, boron iso-propoxide, aluminium sec-butoxide and titanium iso-propoxide. Metal salts, for example metal alkoxides, metal acetates and metal nitrates, can be included with the sol-gel precursors. For example lead nitrate can be mixed with zirconium iso-propoxide and with titanium iso-propoxide to prepare multicompound oxides such as lead zirconium titanium oxide Phosphor layers embodying the invention have the property that they are sufficiently strong and flexible to be peeled from the substrate on which they are prepared without damaging the layer. They are also readily patternable. The peeled sheet can be cut to any desired pattern and then placed between electrodes to function as an electroluminescent panel. They also have good uniformity and high dielectric strength. It is therefore possible to dispense with additional dielectric layers between the electrodes.

In order that the invention may be more fully understood reference will now be made to the examples described below.

EXAMPLE 1

20 ml of linseed oil was injected into a stoppered glass vial and flushed with dry nitrogen. Titanium iso-propoxide was injected into the vial to give a mixture of 10% by weight. The mixture was mixed on a roller for 1 hour and then slurried with an electroluminescent phosphor powder in the ratio of 2:7 w:w to the binder. The phosphor powder that was used was zinc sulphide doped with a high concentration of copper. The slurry was then doctor bladed onto an indium tin oxide (ITO) glass substrate using one layer of adhesive tape to hold the blade above the substrate. The coated panel was covered and allowed to cure in air overnight. The panel was then dried in air at 130° C. for 1 hour. On cooling the film thickness was measured by subtraction of the substrate thickness from the total thickness. The thickness of the film was found to be 30 microns. A micrometer was used for these measurements.

1 gm of barium titanate was mixed with 0.3 gm of the binder precurser and the resulting paste was then applied over the phosphor layer using a doctor blade with two layers of adhesive tape. The panel was then allowed to dry overnight in air and then finally dried in an oven at 130° C. for 1 hour. The resulting layer of barium titanate acts as a reflective coating.

EXAMPLE 2

A phosphor slurry was prepared as described above in Example 1 but with a phosphor to binder ratio of 1:3 w:w. The slurry was then patterned onto a conducting substrate using a K-Bar printer. A second electrode was added by the sublimation of aluminium onto the free surface of the phosphor layer.

EXAMPLE 3

This example corresponds in all respects to Example 1 except that the amount of titanium iso-propoxide that was injected into the vial was reduced to give a mixture of 5% by weight to the linseed oil. It was found that the resulting slurry was slightly too thin to doctor blade evenly.

EXAMPLE 4

This example corresponds in all respects to Example 1 except that the amount of titanium iso-propoxide that was injected into the vial was increased to give a mixture of 20% by weight to the linseed oil. It was found that the resulting slurry was slightly too dry to doctor blade evenly.

The invention claimed is:

1. A phosphor layer for an electroluminescent panel comprising a phosphor powder held in a binder comprising a mixture of two constituents, one constituent being one or more drying oils or semi drying oils or derivatives thereof and the other constituent being one or more sol-gel precursors.

2. A phosphor layer as claimed in claim 1 in which the said one constituent comprises one or more drying oils selected from linseed oil, rape seed oil and sunflower oil.

3. A phosphor layer as claimed in claim 1 in which said one constituent comprises soyabean oil.

4. A phosphor layer as claimed in claim 1 in which the said one constituent comprises an alkyd of a drying oil or a semi drying oil.

5. A phosphor layer as claimed in claim 1 in which the said one constituent comprises linolinic acid.

6. A phosphor layer as claimed in claim 1 in which the said other constituent comprises one or more compounds selected from tetraethyl orthosilicate, boron iso-propoxide, aluminium sec-butoxide and titanium iso-propoxide.

7. A phosphor layer as claimed in claim 1 in which the said other constituent includes one or more compounds selected from metal alkoxides, metal acetates or metal nitrates.

8. A phosphor layer as claimed in claim 1 in which the ratio by weight of the said other constituent to the said one constituent lies between 5% and 20%.

9. A method of manufacturing a phosphor layer for an electroluminescent panel comprising mixing two constituents to form a binder, one constituent being one or more drying oils or semi drying oils or derivatives thereof and the other constituent being one or more sol-gel precursors, mixing a phosphor powder with the binder and then allowing the resulting mixture to dry.

* * * * *

UNITED STATES PATENT AND TRADEMARK OFFICE
CERTIFICATE OF CORRECTION

PATENT NO.         : 7,223,353 B2
APPLICATION NO. : 10/476645
DATED              : May 29, 2007
INVENTOR(S)        : Vecht et al.

It is certified that error appears in the above-identified patent and that said Letters Patent is hereby corrected as shown below:

On the Title Page, Item (73) "Assignee", please delete "Burnel University" and insert --Brunel University.--

Signed and Sealed this

Tenth Day of July, 2007

JON W. DUDAS
*Director of the United States Patent and Trademark Office*